Dec. 16, 1969   A. GEHRING ET AL   3,484,214
DEVICE FOR HETEROGENEOUS CATALYTIC GAS REACTIONS
Filed Nov. 1, 1965

INVENTORS
ALBERT GEHRING
HEINZ SCHNELLER
HEINZ FÜEG
KURT HABERTHÜR
KOICHI MATSUYA
BY H. Edward Mestern 3,484,214
DEVICE FOR HETEROGENEOUS CATALYTIC GAS REACTIONS
Albert Gehring, Tamins, Grisons, and Heinz Schneller, Heinz Füeg, and Kurt Haberthür, Chur, Grisons, and Koichi Matsuya, Felsberg, Grisons, Switzerland, assignors to Inventa A.G. fur Forschung und Patentverwertung, Zurich, Switzerland
Filed Nov. 1, 1965, Ser. No. 505,901
Claims priority, application Switzerland, Nov. 10, 1964, 14,486/64
Int. Cl. B01j 9/00
U.S. Cl. 23—288         5 Claims

ABSTRACT OF THE DISCLOSURE

Apparatus for gas-liquid reaction, using solid catalyst suspended in the liquid feed, comprising tangential jet injectors, a foam separator, a concentric reacted liquid withdrawal means, and recirculation and heat exchange means.

---

The invention relates to an apparatus combination for carrying out heterogeneous catalytic gas reactions, to a process therefor, and particularly to a process and device for catalytic hydrogenation. The apparatus combination is especially applicable to a process for the manufacture of hydroxylamine, but not limited thereto.

It is of fundamental importance to cause an intimate contact between catalyst, liquid and gas in reactions of liquids with gases in the presence of solid catalysts, for instance in the case of hydrogenations, oxidations by means of oxygen or air, or in similar reactions. In general, this is accomplished by keeping the catalyst suspended in the liquid, while in the reactor with the aid of vibrating mixers or agitators, with simultaneous introduction of the gas through one or more nozzles, by means of perforated bottoms or ring conduits, whereby additional turbulence and thus better suspension of the catalyst are attained. Reactors equipped with such auxiliaries are found, e.g., in the hydrogenation of nitric oxide to hydroxylamine in an acid medium, preferably containing hydroxylamine, in the presence of platinum-containing catalysts.

It now has been found that intimate contact can be attained between gas, reaction solution and catalyst phase in a simple manner by means of an apparatus combination, by mixing the liquid plus the catalyst suspended therein with the gas prior to the introduction into the reaction zone. The gas and the reaction solution containing the catalyst in suspension are brought into contact by means of one or more jet injectors, and the mixture thus obtained introduced into the reactor through one or more nipples or feed pipes. These feed pipes are disposed in the lower part of the reactor and lead into the same tangentially. They may be disposed in equal height about the periphery or may be one above the other. The residual energy of the gas-liquid-solid dispersion causes and maintains strong turbulence and spinning or spiral movement within the reactor.

The object of the invention thus is a device and a process for carrying out a heterogeneous catalytic gas reaction which has as its salient features an intimate mixture of gas and liquid, the latter containing the solid catalyst in suspension, prior to the entry in the reactor, by mixing the components in a jet-type injector and introducing the mixture thus obtained tangentially into the reaction zone. The invention is especially suited for catalytical hydrogenations, such as the hydrogenation of nitric oxide to hydroxylamine in acid medium in the presence of a platinum catalyst, in a device as described. However, the device is not limited thereto but can be employed for any process wherein a gas is reacted with a liquid in the presence of a solid catalyst.

The invention now will be further explained with reference to the accompanying drawings and to an example describing a preferred embodiment. However, it should be understood that all this is given merely by way of illustration, and not of limitation, and that numerous changes may be made in the details without departing from the spirit and the scope of the invention as hereinafter claimed.

Figure 1:
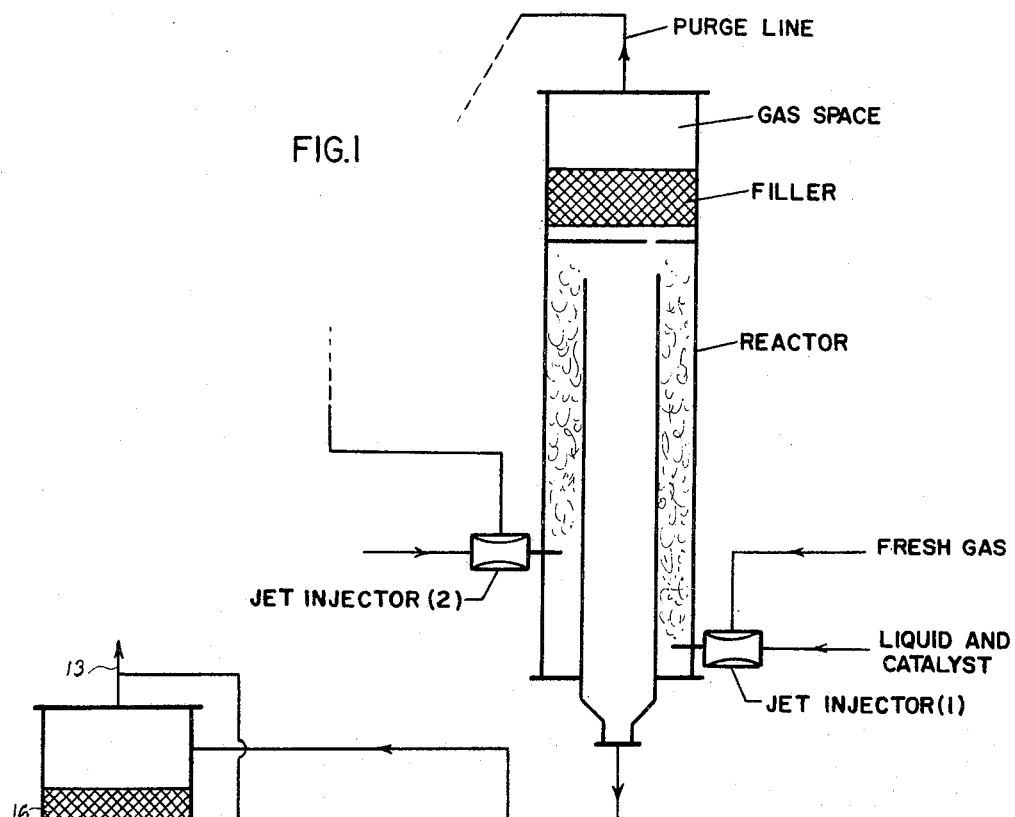
FIG. 1 is a diagram or flowsheet of the device according to the invention, showing the appertaining process and its sequence as named in the legends.

Referring now to these drawings,

FIG. 1 illustrates the working principle of the device and its utilization. The reaction liquid plus catalyst suspended therein flows through jet injector 1, wherein it is mixed with the fresh gas. The latter may be introduced into the injector by vacuum or positive pressure. The mixture thus produced is injected into the reactor in tangential flow and produces and maintains in the annular outer space of the reactor a strong twisting motion. The individual particles of the dispersion travel a helical course to the free surface of the reactor contents. The liquid plus catalyst separates from the bulk of the gas, and a foam formation is suppressed by mechanical filler material. The liquid phase flows downwardly through the inner pipe in a stream of several cm./sec. which is practically free from spinning movement. This stream permits a portion of the gas still present in the reactor to rise and to escape from the gas space. The unreacted gas leaves as "purge gas" and is recycled into the reactor through jet injector 2, or else, is used again in a second step (not shown). The reaction solution containing but little gas and the catalyst still in suspension leaves the reactor through the bottom of the inner pipe.

Depending upon the size of the reactor, one or more jet injectors may be employed which may be disposed radially about the periphery or, especially in the case of large reactors, in several planes, one above the other. It is feasible to use several reactors which may be in parallel or in series; also a plurality of parallel circulating pumps whereby the reaction mixture is introduced into a single reactor by means of several jet injectors. The possible combinations depend upon the size of the reactor and the process employed.

The process according to the invention has the following principal advantages as compared to the commonly used methods:

The use of injectors is facilitated by the mixing of the several components prior to the introduction into the reactor. Jet injectors serve the purpose of intimately mixing the reaction solution with the gas which is pressed in or sucked in (by vacuum) so that the finest possible dispersion of the gas in the liquid is produced, practically in an ideal manner. Smaller gas bubbles provide larger contact surface. With the aid of jet injectors, much smaller gas bubbles can be produced than is the case with nozzles and perforated bottoms. The formation of larger gas bubbles has the further disadvantage that an additional vertical speed component would be obtained which would cause a decrease in the contact time.

By introducing gas, liquid and catalyst particles simultaneously into the lower part of the reactor in order to execute a spiral path up to the free liquid level, very small relative speeds are created among the three kinds of particles, and this greatly favors the course of the desired reaction owing to the long contact time resulting therefrom. Due to the advantages of the process according to the invention, using jet injectors, the large reaction surface and long contact time provides space-time yields which, e.g., in the instance of the reduction of nitric oxide to hydroxylamine, are approximately 10 times larger than with the use of perforated bottoms.

The strongly turbulent flow, induced by the twist, assures good interchange of the reacting substances transversely to the direction of the flow. The installation of agitators in the reactor is not required.

Since an installation of agitator systems or other appurtenances like perforated bottoms is entirely unnecessary, a reactor of simplest constructions is employed which is of major importance technologically and economically. The simple construction of the reactor also exhibits eminent advantages especially when it is necessary to internally clad the same with a rubber or plastic. This frequently is required to protect the reactor walls and for the avoidance of contact of even the slightest amounts of substances harmful to the reaction. The absence of mechanical moving parts eliminates the installation of shaft bearings, transmissions, and gasketing and packing means. This contributes greatly to foolproof operation of the device and eliminates potential sources of trouble.

The following example describes the process according to the invention in a preferred embodiment. However, it is to be understood that this is not to be taken as a limitation to the specific reaction as disclosed therein, but the process and device can equally well be used for other purposes, as stated above.

Figure 2:
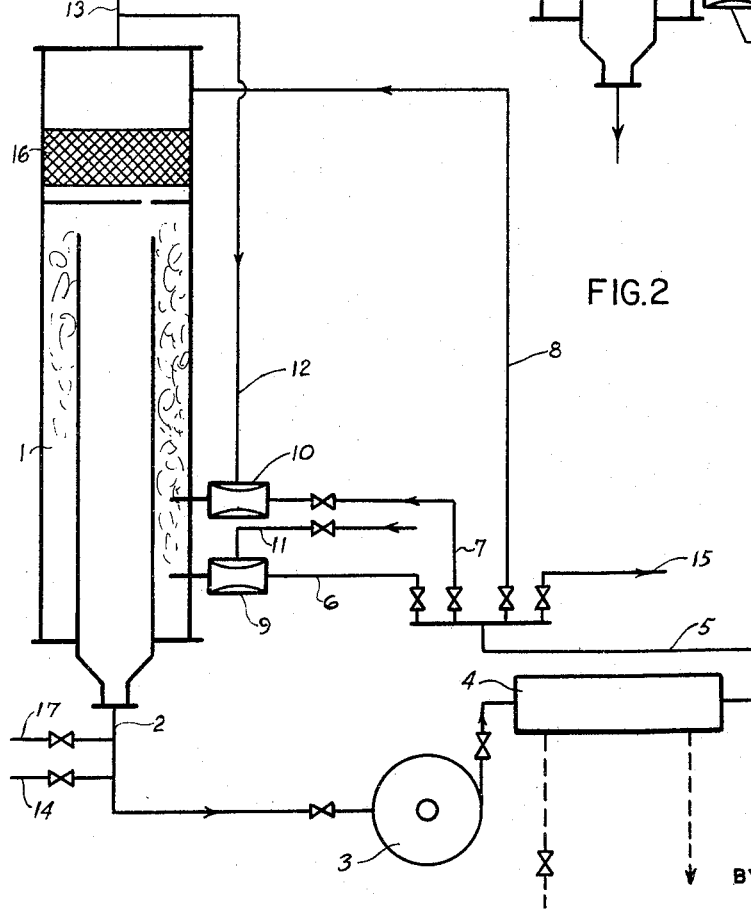
FIG. 2 is a flowsheet relating to the process as disclosed in the example.

The example makes reference to FIG. 2 of the drawing. The temperatures named are in ° C.; the percentages are weight percent. The term "Nm.$^3$" denotes cubic meters at normal atmospheric conditions.

EXAMPLE

Reactor 1 was fabricated from steel and internally clad with hard rubber. It consisted of an outer pipe and a concentric inner pipe and had a total capacity of 750 liters. The inner pipe forms an inner concentric space substantially three quarters of the total height of the reactor. The temperature was held constant at 45° C. by means of heat exchanger 4. The same was provided with its own cooling cycle, not shown. From the reactor, 30 m.$^3$/h. reaction liquid flowed through suction pipe 2 into centrifugal pump 3. The reaction liquid contained 12% hydroxylamine sulfate, 14% sulfuric acid and 1% ammonium sulfate. Pump 3 delivered the liquid through pressure line 5 by way of heat exchanger 4 to the jet injectors 9 (approximately 15 m.$^3$/h.) and 10 (approximately 10 m.$^3$/h.). A small portion, approximately 5 m.$^3$/h., was used as rinse liquid and was conducted through rinse conduit 8 directly into the head of reactor 1. The potential energy of the reaction liquid before the jet injectors was employed for sucking fresh gas (3.5 Nm.$^3$/h. NO and 5.8 Nm.$^3$/h. H$_2$) from line 11 and purge gas (approximately 5 Nm.$^3$/h.) from return flow line 12, respectively. The potential energy before jet injector 9 was 3.3 atmospheres; before jet injector 10, 1.3 atmospheres. The dispersion produced in the jet injectors flowed through tangentially disposed feed pipes into the outer annular space of reactor 1 whereby the kinetic energy present in the dispersion provided a twist to the upward flow. The gas-liquid particles traveled a helical path from the time of entry in the reactor until they reached the free level.

The layer of filler 16 consisted of carbon Raschig rings and served the purpose of suppressing the formation of foam caused by the reaction. The rinse liquid from rinse conduit 8 was distributed uniformly through the filler layer over its entire cross section.

The platinum catalyst (2% platinum on activated carbon) was introduced into the reactor in a quantity of 1–5 g./l. reaction solution by means of a separate line 17 in the form of an aqueous suspension (5 liters water per kg. catalyst). Removal of the catalyst took place simultaneously with that of the end product. The catalyst was filtered therefrom and recycled into the reaction.

We claim as our invention:

1. A device for carrying out catalytic heterogeneous gas reactions involving liquid, solid catalyst and gas, said device being devoid of any moving parts, which comprises, in combination, a vertical cylindrical reactor having an outer cylinder space and an inner concentric space disposed therein; said inner space extending substantially three quarters the height of the total reactor, open at its top and having an outlet at its bottom; a foam separating zone above said inner cylinder; and a gas space between said separating zone and the top of the reactor; a gas outlet through the otherwise closed top of said reactor; at least one first jet injector outside said reactor for mixing fresh gas and liquid; means for introducing fresh gas and liquid into said jet injector; a feed pipe leading from each said jet injector into the lower part of said outer space in a tangential direction imparting to the mixture a spiral flow within the outer space to the liquid level; a second jet injector for mixing reaction liquid with gas recovered from said gas outlet; a second feed pipe extending into the lower part of said outer space, connecting said second jet injector therewith; a connecting pipe from said gas outlet to said second jet injector; the reacted liquid being drawn off through said outlet at the bottom of said inner space after downwardly traversing the same in an essentially non-spiral flow; means for withdrawal of said reacted liquid from the reaction and for recirculation of a small portion thereof into the top of said reactor; and heat exchange means for maintaining a given temperature in said reactor.

2. The device as defined in claim 1 wherein all feed pipes are disposed peripherally about said reactor in an even plane.

3. The device as defined in claim 1, wherein all feed pipes are disposed at different levels at the lower part of said reactor.

4. The device as defined in claim 1, wherein said separating zone is filled with a foam suppressant.

5. The device as defined in claim 4, wherein said foam depressant consists of carbon Raschig rings.

References Cited

UNITED STATES PATENTS

| 3,087,917 | 4/1963 | Scoggin. |
| 3,100,792 | 8/1963 | Emrick _____ 24—283 X |
| 3,124,518 | 3/1964 | Guzman et al. _____ 23—288.3 X |

JOSEPH SCOVRONEK, Primary Examiner

U.S. Cl. X.R.

23—190, 283, 285; 259—4; 261—76